United States Patent [19]

Volz

[11] Patent Number: 5,281,014
[45] Date of Patent: Jan. 25, 1994

[54] ELECTROHYDRAULIC CONTROL APPARATUS FOR ANTI-LOCK BRAKE SYSTEM

[76] Inventor: Peter Volz, In den Wingerten 14, 6100 Darmstadt, Fed. Rep. of Germany

[21] Appl. No.: 847,097
[22] PCT Filed: Oct. 6, 1990
[86] PCT No.: PCT/EP0/901680
§ 371 Date: Apr. 13, 1992
§ 102(e) Date: Apr. 13, 1992
[87] PCT Pub. No.: WO91/05686
PCT Pub. Date: May 2, 1991

[30] Foreign Application Priority Data

Oct. 20, 1989 [DE] Fed. Rep. of Germany ....... 3935071

[51] Int. Cl.$^5$ .......................... B60T 13/18; B60T 13/20
[52] U.S. Cl. ...................................... 303/116.1; 303/10
[58] Field of Search ................. 303/10, 11, 87, 113.1, 303/113.4, 116.1, 116.2, DIG. 3, DIG. 4

[56] References Cited

U.S. PATENT DOCUMENTS

| | | | |
|---|---|---|---|
| 4,826,255 | 5/1989 | Volz | 303/116.1 X |
| 4,840,435 | 6/1989 | Steffes | 303/DIG. 4 X |
| 4,892,364 | 1/1990 | Burgdorf | 303/116.1 |
| 5,000,525 | 3/1991 | Reinartz et al. | 303/116.1 |
| 5,013,097 | 5/1991 | Gutzeit et al. | 303/DIG. 4 X |

FOREIGN PATENT DOCUMENTS

| | | | |
|---|---|---|---|
| 258587 | 3/1988 | European Pat. Off. | 303/11 |
| 265623 | 4/1988 | European Pat. Off. | |
| 313292 | 4/1989 | European Pat. Off. | |
| 3237959 | 5/1983 | Fed. Rep. of Germany. | |
| 3404135 | 8/1985 | Fed. Rep. of Germany. | |
| 3731408 | 4/1989 | Fed. Rep. of Germany. | |
| 3813172 | 11/1989 | Fed. Rep. of Germany. | |
| 3813174 | 11/1989 | Fed. Rep. of Germany. | |
| 3834539 | 4/1990 | Fed. Rep. of Germany | 303/11 |
| 3836082 | 4/1990 | Fed. Rep. of Germany. | |
| 2620991 | 3/1989 | France. | |
| 2197402 | 5/1988 | United Kingdom. | |
| 8908573 | 9/1989 | World Int. Prop. O. | |
| 8910287 | 11/1989 | World Int. Prop. O. | |
| 1005686 | 5/1991 | World Int. Prop. O. | 303/116.1 |

*Primary Examiner*—Robert J. Oberleitner
*Assistant Examiner*—Alfred Muratori
*Attorney, Agent, or Firm*—Robert P. Seitter; J. Gordon Lewis

[57] ABSTRACT

An anti-locking hydraulic brake system in which the pedal is brought into a variable position during a brake pressure control action. A correcting variable is determined in such a way that any pressure rating in the power chamber is correlated with a position of the power piston, the correlation between the pressure and the position roughly corresponding to the ratio of pressure and position during a noncontrolled braking action.

11 Claims, 1 Drawing Sheet

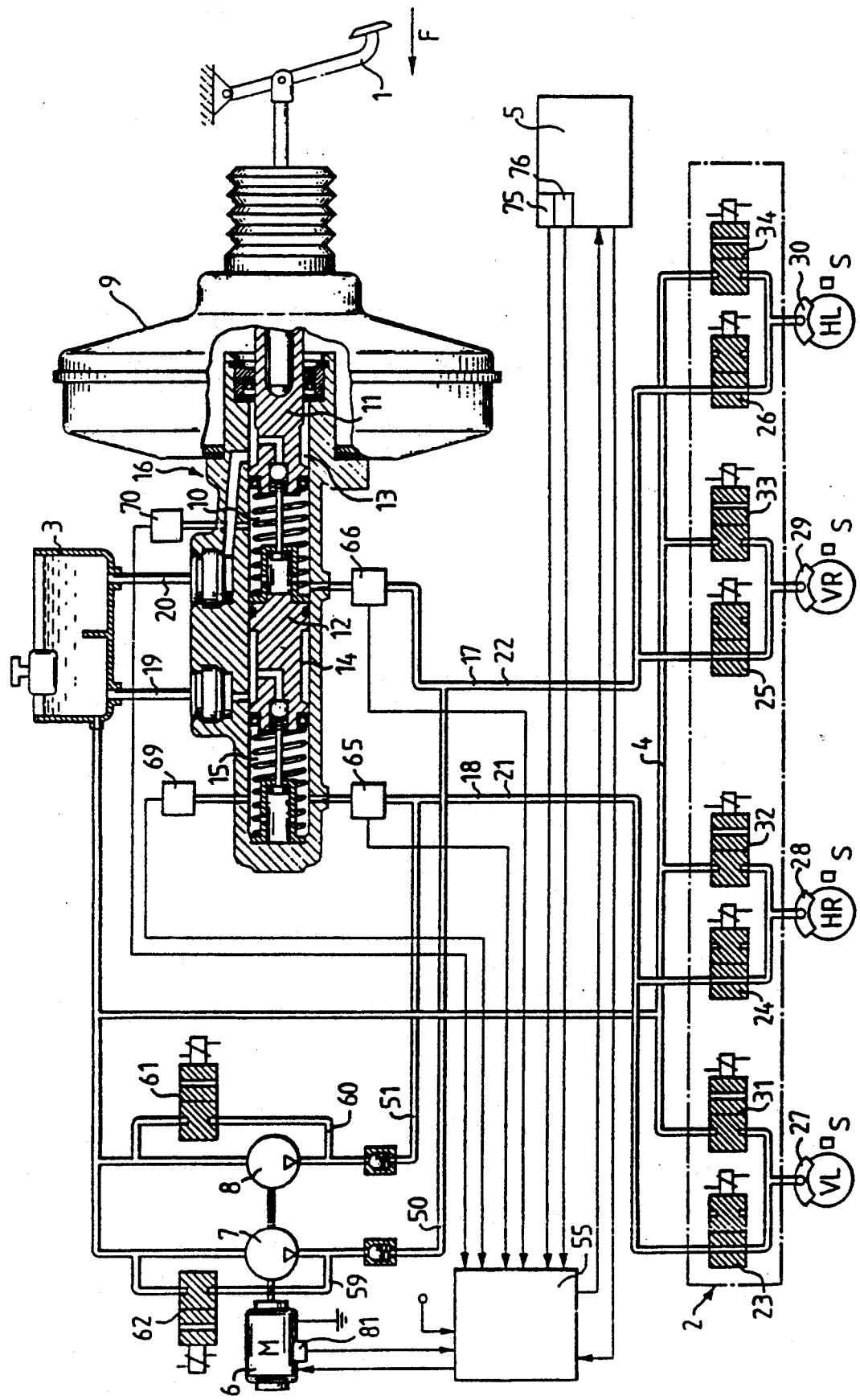

ELECTROHYDRAULIC CONTROL APPARATUS FOR ANTI-LOCK BRAKE SYSTEM

FIELD OF THE INVENTION

The present invention relates to an electrohydraulic control apparatus for use in an anti-lock vehicle braking system of the type which is described in GB-A-22 197 402. An improvement upon the apparatus of GB-A-22 197 402 is illustrated in U.S. Pat. No. 4,892,364. FR-A-26 20 991 is also considered as state of the art.

BACKGROUND OF THE INVENTION

It is described in the first-mentioned publication that during a control action the power piston of the master cylinder is brought into a defined position which guarantees that a sufficient volume of pressure fluid remains in the master cylinder so that the vehicle still can be braked to a sufficient extent in the event of failure of the pumps. The defined position is referred to by "B" in the publication. In the course of a control action, the power piston, and hence the pedal, are brought into a defined position which is independent of the pedal effort being brought to bear by the driver. The relation between the pedal travel and the brake pressure and, respectively, master cylinder pressure during a non-controlled braking action which is known to the driver is, thus, lost.

U.S. Pat. No. 4,892,364 suggests accomplishing the pedal positioning by variation of the delivery volume of the pump, and particularly to change the drive power of the pump motor. It is known from the French specification to vary the effective output of a pump in an anti lock system in that, with the drive power of the pump motor remaining constant, a by-pass between the pressure side and the suction side of the pump is opened so that the pump delivers in a circuit, and effective fluid delivery into the brake circuit does not take place.

SUMMARY OF THE INVENTION

The present invention has as an object to adapt the position of the power piston and, respectively, of the pedal to be adjusted to the master cylinder pressure also during a control operation.

It is a further object of the present invention to put at disposal appropriate means for monitoring the power piston travel. The known applications provide for a switch which is actuated directly by the power piston. This arrangement is cumbersome to mount and difficult to adjust. It is therefore proposed to arrange a flowmeter in the brake line, with the quantity of pressure fluid entering into or exiting from the power chamber of the master cylinder being sensed, whereby direct conclusions can be drawn in regard to the position of the piston.

Further details of the invention will be explained by the following description of one embodiment.

BRIEF DESCRIPTION OF THE DRAWING

The FIGURE shows an anti-locking control apparatus according to the invention.

DETAILED DESCRIPTION OF THE INVENTION

The apparatus is comprised of the following units: a vacuum brake power booster 9 which is actuated by the brake pedal 1, a tandem master cylinder 16, a modulator 2 for the pressure control during the anti-locking control mode, an electronic controller 5 for the processing of sensor signals, and a hydraulic pump 7, 8 which is driven by an electric motor 6.

In the FIGURE, the system is shown with the brake pedal in the release position. The pressure chambers 10, 15 of the master cylinder are connected in a known manner to the hydraulic fluid reservoir 3 through open central valves, connecting ducts in the interior of the pistons, and annular chambers 13, 14 in the power pistons 11, 12, bores and hydraulic lines 19, 20.

The two pressure circuits 21, 22 of the master cylinder are connected to the wheel brakes 27, 28, 29, 30 through electromagnetically actuatable inlet valves 23, 24, 25, 26 switched to open in the basic position when de-energized ("SO valves").

The wheel brakes 27, 28 and 29, 30, switched in parallel, respectively, are associated with the diagonally arranged pressure circuits (brake circuits) 21, 22. The following designations are selected to denote the arrangement of the vehicle wheels corresponding to the aforementioned brakes: "VL" for front left, "HR" for rear right, "VR" for front right, "HL" for rear left. The wheel brakes 27, 28, 29, 30 are, furthermore, connected to the reservoir 3 through electromagnetically actuatable outlet valves 31, 32, 33, 34 which are closed in the basic position, that is to say when de-energized ("SG valves"), via a return line 4. The vehicle wheels are equipped with inductive sensors S which interact with toothed discs rotating synchronously with the rotation of the wheels and which generate electric signals representative of the rotational behavior of the wheels, that is to say, the circumferential wheel speed and changes of that speed. These signals are conveyed to the electronic controller 5. The electronic controller processes the sensor signals on the basis of a control algorithm generating output signals (brake pressure control signals) by which the SO valves and SG valves are switched in the brake pressure control mode, as a result of which the brake pressures are decreased, are kept constant or are increased again in the individual wheel cylinders in accordance with the control algorithm. For this purpose, the actuating magnets of the SO valves and SG valves are actuated through the outputs of the electronic controller. In the brake pressure control mode, the electric motor 6 of the pumps 7, 8 is put into operation. The switching-in signal is supplied to the electric motor by the electronic controller 5. In the control mode, the pump builds up pressure in the pressure lines 50, 51. These lines represent a hydraulic fluid path which is linked to the hydraulic fluid path of the tandem master cylinder in the form of the pressure lines 21, 22. This means that in the control mode, the pressure chambers 10, 15 of the tandem master cylinder are pressurized by the pumps.

During operation of the brake in the normal braking mode, the pedal effort F, assisted by the vacuum within the booster 9, will be transmitted to the master cylinder pistons. The central valves in the pistons close, as a result of which pressure can now build up within the pressure chambers 10, 15 and, thus, in the brake circuits 21, 22, which pressure is conveyed, through the SO valves 23, 24, 25, 26, to the wheel cylinders. Now, if and when a locking tendency is recognized at one or at a plurality of wheels with the aid of the sensors S and of the electronic controller 5, then the anti-locking control mode will be started. The driving motor 6 of the pumps 7, 8 will be switched in, as a result of which pressure will be built up in the pressure lines 50, 51 which acts, on one hand, through the SO valves, on the wheel cylinders of the wheel brakes and which, on the other hand, pressurizes the pressure chambers of the master cylinder as described above.

In accordance with the control algorithm, further signals from the electronic controller 5 lead to a switching-over of the electromagnetically actuatable SO and SG valves.

As a result of the pump pressure within the power chambers 10 and 15, the power pistons 11 and 12 in the FIGURE will move to the right.

The apparatus includes the following in order to achieve, during a control action, a fixed relation between the brake pedal position and the pressure in the master cylinder and the power piston.

The flowmeters 65, 66 are incorporated in the brake lines 17, 18 at the outlet of the master cylinder. Downstream of the flowmeters, the pressure lines 50, 51 end in the brake lines.

Flowmeters 65, 66 detect both the volume of hydraulic fluid which is conveyed from the power chambers into the brake circuits and the flow of hydraulic fluid in the opposite direction. An indication of the flow rates therefore permits drawing a direct conclusion on the position of the power piston. Signals representative of the flow through flowmeters 65, 66 are supplied to electric motor control unit 55.

In addition, pressure sensors 69, 70 detect the pressure within the power chambers 15, 10. Pressure sensors 69, 70 convert the hydraulic pressure into electric signals which are conveyed over the lines to the electric motor control unit 55.

Reference numerals 75, 76 represent control algorithms which will be called volume models in the following.

With the aid of the volume models, the volumetric demand for the power chambers of the tandem master cylinder is calculated. The delivery volumes of the pumps are established such that an arbitrary theoretical position of the power pistons and, thus, of the brake pedal is reached during the anti-locking control mode. Signals representative of the volumetric demand of the tandem master cylinder are supplied to the output of the electronic controller 5 which are transmitted over the electric lines to the electric motor control unit 55.

The electric motor 6 is furnished with a sensor 81 for sensing the rotation rate of the motor.

The functions of the electric motor control unit comprise switching the motor on and off through a relay, controlling the electric motor and, consequently, the delivery volumes of the pumps in order to achieve the theoretical positions of the power pistons of the master cylinder and of the brake pedal. The functioning of the pumps, the rotation rate of the motor, the pressure in the power chambers, and the supply of a sufficient reserve of hydraulic fluid for the master cylinder are monitored.

The control of the electric motor serves to increase the operating comfort of the brake pedal and besides the positioning itself also to define the positioning speed for the brake pedal. Furthermore, a virtually complete noise absorption can be attained by the control of the electric motor.

The apparatus works as follows:

Signals for the volumetric demand for the push rod piston and the floating piston are furnished during the control mode on the basis of the volume models 75, 76 which are stored in the electronic controller. The volumetric demand signals are processed in the electric motor control unit 55 together with the travel sensor signals, the pressure sensor signals and the rate-of-revolutions sensor signals to generate position signals at the output connected to the electric motor. As a result, the delivery volumes of the pumps 57, 58 are varied. By the variation of the delivery volumes, the desired positioning and positioning speed of the power pistons, in particular of the push-rod piston, and, thus of the brake pedal, are brought about.

As an alternative of or in addition to the regulation through the electric motor, the pump valves 61, 62 can be employed which are clocked and which, thus, vary the delivery rate of the pumps in accordance with the control algorithms stored in the electronic controller.

An exact positioning of the pedal and a comprehensive monitoring of the pumps are achieved by the described system. The delivery volumes of the two actuating circuits of the brake system permit individual control. The pedal feeling is improved. The energy consumption is reduced. A standard tandem master cylinder with a breather hole system can be employed as a tandem master cylinder.

The effect of the measures described in the embodiment of the present invention is that, during a brake pressure control action, a defined relationship exists between the pedal effort and the pedal travel. The result, very easily achieved by the described means, is a determination of the travels of the power pistons and, thus, of the pedal in particular, due to the inclusion of flowmeters.

What is claimed:

1. A system for anti-lock braking control of a vehicle comprising:

a brake pedal;

a master cylinder responsive to movement of said brake pedal and having at least one pressure chamber in which fluid pressure varies with brake pedal movement in a predetermined manner under normal braking;

a plurality of brakes;

first sensing means responsive to the rotational behavior of a plurality of wheels of the vehicle individually associated with said brakes for developing brake pressure control signals representative of a locking tendency of any of the wheels;

a pressure fluid reservoir;

an auxiliary pressure source;

pressure fluid conducting means extending between said pressure fluid reservoir, said brakes, said pressure chamber of said master cylinder, and said auxiliary pressure source for conducting pressure fluid:

(a) between said pressure fluid reservoir and said brakes, (b) between said auxiliary pressure source and said pressure chamber, (c) between said auxiliary pressure source and said brakes, and (d) between said pressure chamber and said brakes;

second sensing means for developing:

(a) pressure fluid flow signals representative of the flow of pressure fluid into and from said pressure chamber of said master cylinder, and (b) pressure fluid pressure signals representative of the pressure of pressure fluid in said pressure chamber;

means for supplying volumetric signals representative of the volume of pressure fluid required in said pressure chamber of said master cylinder to position said pedal after a locking tendency has been sensed at a selected position corresponding to said selected position of said brake pedal under normal braking; and means responsive to:
(a) said brake pressure control signals,
(b) said pressure fluid flow signals,
(c) said pressure fluid pressure signals, and
(d) said volumetric signals for actuating said auxiliary pressure source and for controlling the passage of pressure fluid through said pressure fluid conducting means:
(a) between said pressure fluid reservoir and said brakes,
(b) between said auxiliary pressure source and said pressure chamber,
(c) between said auxiliary pressure source and said brakes, and
(d) between said pressure chamber and said brakes.

2. A system for anti-lock braking control of a vehicle according to claim 1 further including second pressure fluid conducting means extending between said pressure fluid reservoir and said pressure chamber of said master cylinder.

3. A system for anti-lock braking control of a vehicle according to claim 1 wherein said master cylinder is a tandem master cylinder and has a second pressure chamber and:
(a) said second sensing means develop:
(i) pressure fluid flow signals representative of the flow of pressure fluid into and from both said pressure chambers of said tandem master cylinder, and
(ii) pressure fluid pressure signals representative of the pressure of pressure fluid in both said pressure chambers of said tandem master cylinder, and
(b) said means for supplying volumetric signals supply volumetric signals representative of the volume of pressure fluid required in both said pressure chambers of said tandem master to position said pedal after a locking tendency has been sensed at a selected position corresponding to said selected position of said brake pedal under normal braking.

4. A system for anti-lock braking control of a vehicle according to claim 3 wherein said second sensing means include:
(a) a first flowmeter in said pressure fluid conducting means at an outlet from one of said pressure chambers of said tandem master cylinder for developing pressure fluid flow signals representative of the flow of pressure fluid into and from said one pressure chamber, and
(b) a second flowmeter in said pressure fluid conducting means at an outlet from the other of said pressure chambers of said tandem master cylinder for developing pressure fluid flow signals representative of the flow of pressure fluid into and from said other pressure chamber.

5. A system for anti-lock braking control of a vehicle according to claim 4 wherein said second sensing means further include first and second pressure sensors individually responsive to fluid pressure in said pressure chambers of said tandem master cylinder for developing said pressure fluid pressure signals.

6. A system for anti-lock braking control of a vehicle according to claim 5 wherein said auxiliary pressure source includes:
(a) a motor,
(b) pump means driven by said motor and having a pressure end and a suction end for supplying pressure fluid to said pressure chambers of said tandem master cylinder and said brakes, and
(c) valve means extending between said pressure end of said pump means and said suction end of said pump means for regulating pressure fluid supplied by said pump means.

7. A system for anti-lock braking control of a vehicle according to claim 5 further including a brake power booster disposed between said brake pedal and said tandem master cylinder and coupling said brake pedal to said tandem master cylinder.

8. An anti-locking control apparatus for hydraulic automotive vehicle brake systems, with a master cylinder which comprises at least one power piston and one power chamber, with a plurality of wheel cylinders, with a pressure modulator which comprises throughflow valves and shut-off valves and which modulates hydraulic pressure in the wheel cylinders during a controlled braking action; with at least one pump connecting with its pressure side to the power chamber and to the pressure modulator, with at least one electronic controller which processes wheel sensor signals to generate position signals for said throughflow and shut-off valves of the pressure modulator, with a travel sensor to monitor the movement of said power piston and for developing travel sensor signals, a pressure sensor to monitor the pressure in the power chamber and for developing pressure sensor signals, with the travel sensor signals and the pressure sensor signals being employed as a correcting variable to control the delivery volume of the pump, characterized in that the correcting variable is determined in such a manner that any pressure rating in the power chamber is correlated to a position of the power piston, wherein the correlation between the pressure rating and the position of the power piston roughly corresponds to a correlation between the pressure rating and the position of the power piston during a noncontrolled braking action, with the proviso that a minimum quantity of pressure fluid remains in the power chamber of the master cylinder.

9. An apparatus as claimed in claim 8, characterized in that brake lines lead away from the power chamber of the master cylinder and flow sensors, positioned in the brake lines, monitor the quantity of pressure fluid which flows into an from the master cylinder.

10. An apparatus as claimed in claim 8, characterized in that the pressure side of the auxiliary pump is connected to the suction side by a line which is furnished with a valve element, wherein said valve element is responsive to the correcting variable and is an electromagnetically actuatable valve which shuts off in its position of rest and which is switchable by electric signals.

11. An apparatus as claimed in claim 8, characterized in that the pump is driven by an electric motor, the correcting variable being utilized to clock the electric voltage of the drive motor and, thus, to control the number of revolutions.

* * * * *

UNITED STATES PATENT AND TRADEMARK OFFICE
CERTIFICATE OF CORRECTION

PATENT NO. : 5,281,014
DATED : January 25, 1994
INVENTOR(S) : Peter Volz

It is certified that error appears in the above-indentified patent and that said Letters Patent is hereby corrected as shown below:

Claim 1, column 5, lines 12-15: "for actuating said auxiliary pressure source and for controlling the passage of pressure fluid through said pressure fluid conducting means:" begins on a new line
Column 6,
Claim 9, line 53: delete "an" and substitute therefor --and--

Signed and Sealed this

Nineteenth Day of July, 1994

Attest:

BRUCE LEHMAN

Attesting Officer            Commissioner of Patents and Trademarks